United States Patent Office 3,080,673
Patented Mar. 12, 1963

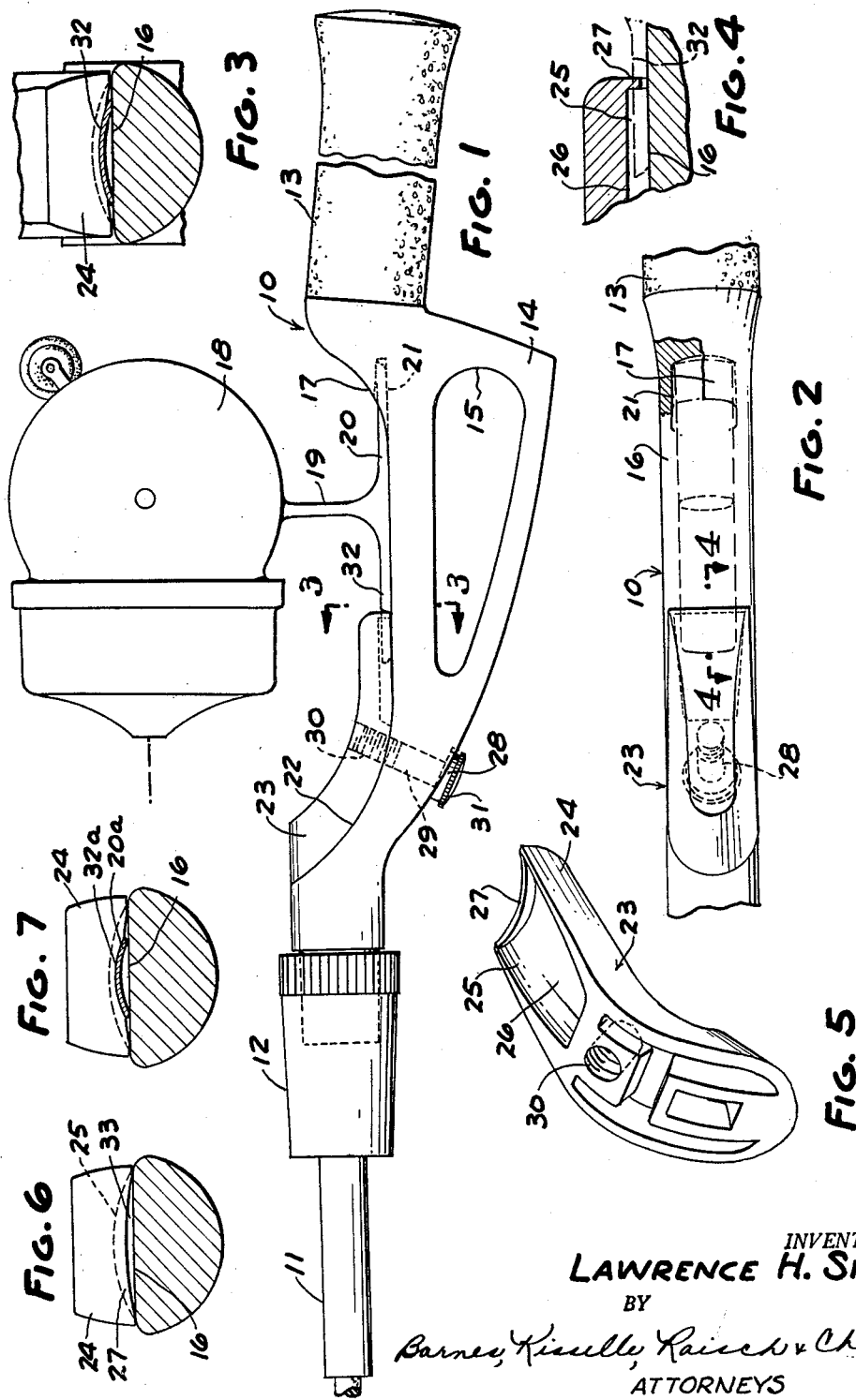

3,080,673
FISHING ROD HANDLE STRUCTURE
Lawrence H. Smith, Birmingham, Mich., assignor to Helm Accessories, Inc., Detroit, Mich., a corporation of Michigan
Filed Mar. 28, 1960, Ser. No. 17,911
4 Claims. (Cl. 43—22)

This invention relates to fishing rods and particularly to a structure for clamping a fishing reel in position on a fishing rod handle.

Most fishing reels that are used comprise an elongated foot that is used for mounting the reel on the fishing rod. A major problem in mounting such a fishing reel on a fishing rod is that the feet of the fishing reels vary in shape and therefore unless the fishing rod clamping and locking arrangement is specifically adapted for a particular reel, it is impossible to positively lock the reel in position without substantial alterations and repairs.

It is an object of this invention to provide a novel fishing rod handle structure which positively locks the fishing reel in position and can be readily adapted with a minimum of effort to clamping and locking fishing reels having differently shaped mounting structures.

In the drawings:

FIG. 1 is a fragmentary side elevation of a fishing rod embodying the invention.

FIG. 2 is a fragmentary plan view of the fishing rod shown in FIG. 1 with the reel removed.

FIG. 3 is a fragmentary sectional view taken along the line 3—3 in FIG. 1.

FIG. 4 is a fragmentary sectional view taken along the line 4—4 in FIG. 2.

FIG. 5 is a bottom perspective view of the clamp used in the reel locking structure.

FIG. 6 is a view similar to FIG. 3 before the reel has been mounted and the locking structure has been adapted to the reel.

FIG. 7 is a view similar to FIG. 3 showing how the structure is adapted to a reel having a differently shaped supporting structure.

Referring to FIG. 1, the fishing rod comprises a handle 10 and a rod 11 adapted to be removably mounted on one end of the handle 10 by a locking structure 12 of conventional construction. Handle 10 includes a grip 13 and a finger forming loop portion 14 that provides an opening 15 through which the index finger of the fisherman may extend.

A portion of the top surface of the handle 10 is formed with a substantially flat surface forming a seat 16. The surface forming the seat 16 extends rearwardly beneath an overhanging ledge 17 to form a seat for one end of the supporting structure of the reel. As shown in FIG. 1, reel 18 conventionally includes a downwardly extending leg 19 and a foot 20 on the lower end of leg 19 at a right angle to leg 19. The foot 20 is usually curved in cross section and has a top surface which is concave upwardly. The space 21 between the overhang 17 and surface 16 is adapted to receive one end of foot 20.

As further shown in FIG. 1, the handle includes a curved concave surface 22 which extends upwardly and forwardly from the front end of seat 16. A clamp 23 is adapted to seat on surface 22 the front end of seat 16. As shown in FIG. 5, the clamp 23 is made of a suitable material, for example, an aluminum die cast part. The end 24 of clamp 23 which is adjacent the seat 16 is formed with a cut away portion or cavity 25 so that the base 26 of the cavity 25 is spaced from the seat 16 (FIG. 4). An integral web 27 is provided on the end 24 of the clamp 23 and extends downwardly from base 26 toward the seat 16 as shown in FIG. 4. The clamp is adapted to be held in position by means of a screw 28 that extends through an opening 29 in the handle and is threaded in an opening 30 in the clamp. The end 31 of the screw is enlarged and knurled so that it can be readily grasped.

According to the invention, the web 27 can be readily cut away as by filing to conform the free edge of the web 27 to the top surface 32 of the foot 20 so that when the clamp 23 is seated against the surface 22 the web 27 clamps against the top surface 32 of foot 20 locking the reel 18 in position.

The general shape of the web 27 before being cut away to conform to the upper surface of the foot 20 can be as shown in FIG. 6 wherein the lower edge of the web is concave and a slight space 33 is provided between the lower edge of the web 27 and the seat 16. When the web 27 is filed away, it conforms to the surface 32 of the foot (FIG. 3). It can readily be seen that the web can be shaped without too much difficulty to conform to the shape of the top surface of the foot of any reel. For example, as shown in FIG. 7, the web is cut to a different configuration to conform to the surface 32a of the foot 20a on a different reel.

It can thus be seen that I have provided a simple and effective means for locking the reel in position which can be readily adapted without excessive alteration or modification of the handle to conform to the configuration of the foot of various types of reels.

I claim:

1. In a fishing rod handle structure, the combination comprising a portion of the handle defining a seat for the foot of a reel, means at one end of said seat for engaging one end of said foot, a clamp, means for locking said clamp on said handle in position to engage the top surface of the other end of said foot, said clamp having a longitudinally extending concavity formed in the underside thereof and dimensioned to receive a reel foot, a thin transverse web extending downwardly on the outer edge of said concavity toward the seat on said handle and adapted to engage the foot of the reel, said web having sufficient thinness in a direction measured longitudinally of the seat such that said web is adapted to be readily cut away to conform to the configuration of the upper surface of said other end of said foot of the reel.

2. In a fishing rod handle, the combination comprising a portion of said handle defining a seat against which the foot of a reel may be positioned, means at one end of said seat for engaging one end of said foot, a clamp having surface portions thereof engaging parts of said handle, means for locking said clamp in position on said handle against longitudinal movement with said surface portions engaging said parts of said handle, said clamp when in locked position having longitudinal edge portions engaging said seat and a longitudinally extending concavity formed in the underside thereof and dimensioned to receive a reel foot, a thin transverse web extending downwardly on the outer edge of said concavity and adapted to engage the foot of the reel, said web having sufficient thinness in a direction measured longitudinally of the seat such that said web is readily adapted to be cut away to cause said web to conform to the configuration of the upper surface of the portion of said foot engaged and underlying said web.

3. In a fishing rod handle, the combination comprising a surface defining a flat seat on said handle, said handle having a concave surface at one end of said seat extending upwardly and forwardly from said seat, a clamp having a complementary convex surface, means for locking said clamp in fixed position on said concave surface, said clamp having a longitudinally extending concavity formed in the underside thereof and dimensioned to receive a reel foot, and a thin transverse web extending downwardly on the outer edge of said concavity, said web being of sufficient thinness in a direction measured longitudinally of said seat to be readily cut away as by filing.

4. In a fishing rod handle, the combination comprising a surface defining a flat seat on said handle extending longitudinally thereof, said handle having a concave surface at one end remote from the handle extending upwardly and forwardly from said seat, means at the other end of said seat for engaging one end of the foot of the reel, a clamp member having a convex surface complementary to the concave surface of said handle, said clamp member having a longitudinally extending concavity formed on the underside thereof and dimensioned to receive a reel foot adjacent said one end of said seat, an integral thin transverse web on said clamp member at the outer edge of said concavity extending downwardly from said last-mentioned portion of said clamp member and adapted to engage the foot of the reel, said web being of sufficient thinness in a direction measured longitudinally of said seat to be readily cut away as by filing, and screw means extending through said handle and threaded into said clamp member for pulling said clamp member into engagement with said concave surface of said handle and locking said clamp member on said handle and with said web in engagement with the foot of the reel.

References Cited in the file of this patent

UNITED STATES PATENTS

| | | |
|---|---|---|
| 2,102,237 | Kinnear | Dec. 14, 1937 |
| 2,111,080 | Stromgren | Mar. 15, 1938 |
| 2,526,080 | McLane | Oct. 17, 1950 |
| 2,809,461 | Atols | Oct. 15, 1957 |
| 2,839,863 | Heffel | June 24, 1958 |

FOREIGN PATENTS

| | | |
|---|---|---|
| 635,245 | Great Britain | Apr. 5, 1950 |